Nov. 3, 1970   E. H. DAGGETT   3,538,299
CONSTANT ARC LENGTH WELDING SYSTEM INSENSITIVE
TO CURRENT CHANGES
Filed March 20, 1969   3 Sheets-Sheet 1
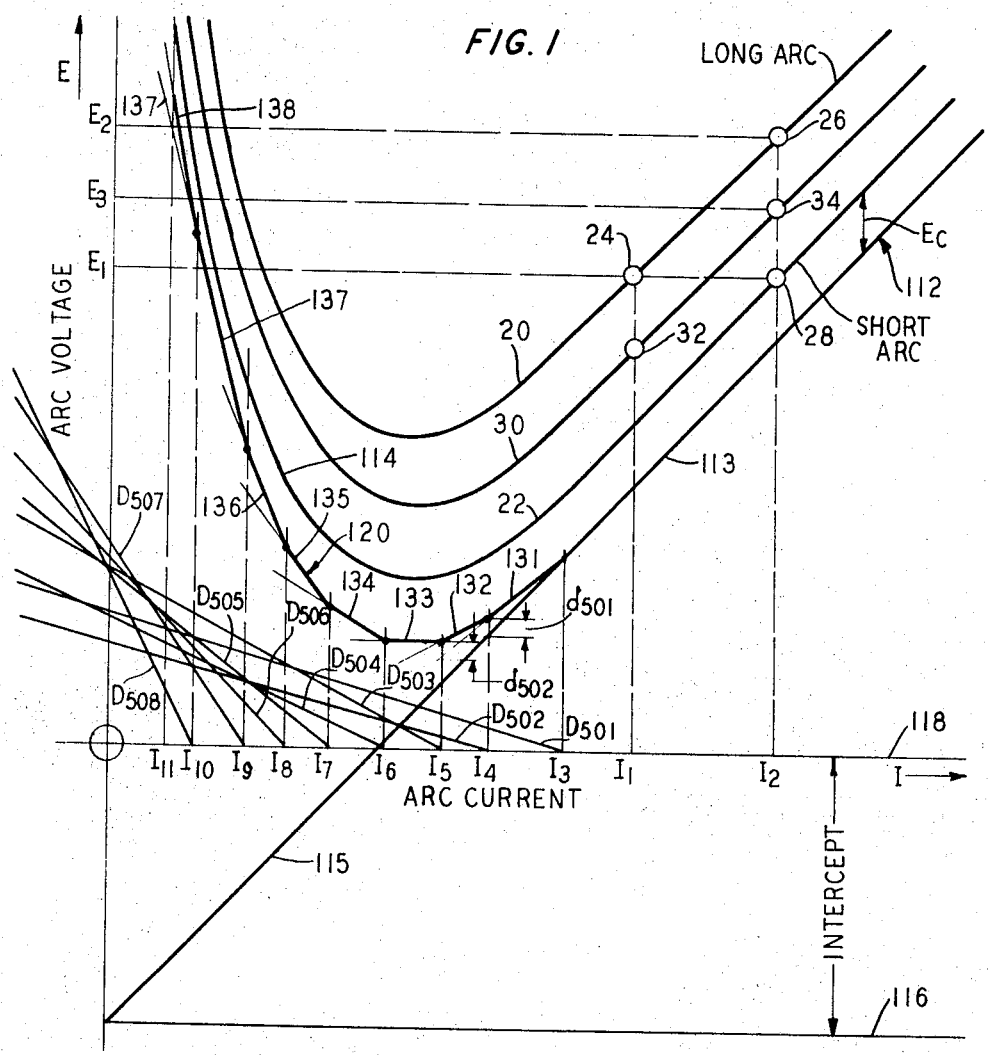
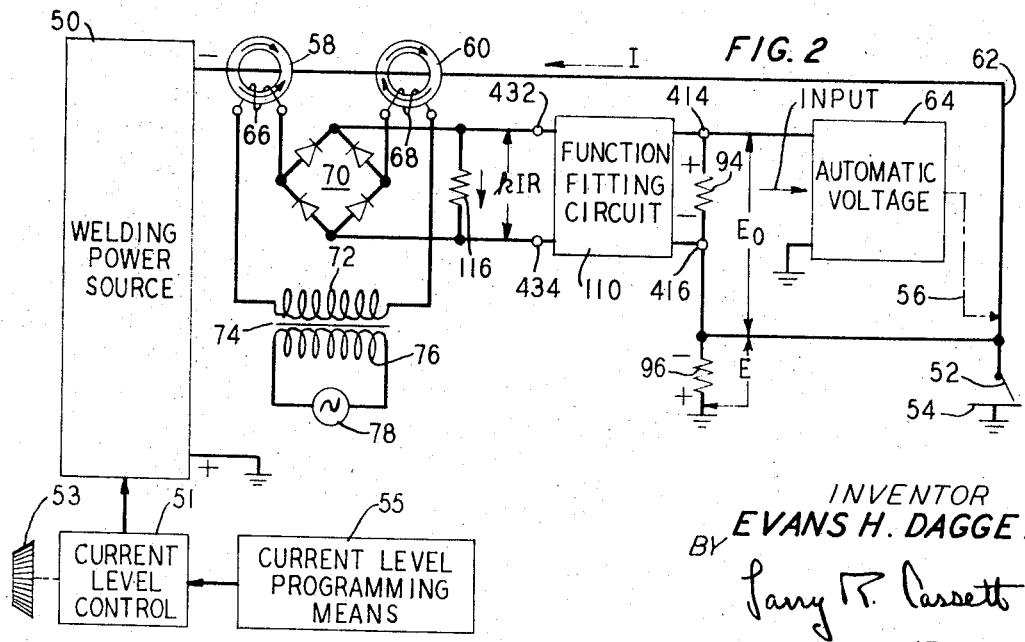
INVENTOR
EVANS H. DAGGETT
BY
Larry R. Cassett
ATTORNEY

INVENTOR
EVANS H. DAGGETT
BY
ATTORNEY

Nov. 3, 1970   E. H. DAGGETT   3,538,299
CONSTANT ARC LENGTH WELDING SYSTEM INSENSITIVE
TO CURRENT CHANGES
Filed March 20, 1969   3 Sheets-Sheet 3

INVENTOR
EVANS H. DAGGETT
BY
Jerry R. Cassett
ATTORNEY

United States Patent Office 3,538,299
Patented Nov. 3, 1970

3,538,299
CONSTANT ARC LENGTH WELDING SYSTEM INSENSITIVE TO CURRENT CHANGES
Evans H. Daggett, Murray Hill, N.J., asignor to Air Reduction Company, Incorporated, New York, N.Y., a corporation of New York
Continuation-in-part of application Ser. No. 562,015, June 30, 1966. This application Mar. 20, 1969, Ser. No. 808,826
Int. Cl. B23k 9/10
U.S. Cl. 219—124          12 Claims

ABSTRACT OF THE DISCLOSURE

The arc length of an electric arc welding system is maintained constant while the system operates at any desired current level and while deliberate changes are made in the current level either manually or in response to programming. Motive means for varying the spacing between the arc electrode and the workpiece are controlled by differential action of two control signals. One control signal is developed by arc voltage sensing means and the other by arc current sensing means. The two control signals are so proportioned that, for constant arc length, the voltage difference between the control signals is constant, regardless of variations in the arc current. Any change in arc length alters the control signal in such sense as to cause the arc length to be corrected to maintain the arc length constant.

---

This application is a continuation-in-part of my application Ser. No. 562,015, filed June 30, 1966.

This invention relates to automatic control of arc length in a welding system employing a substantially nonconsumable welding electrode in an inert atmosphere, and more particularly to a provision in such a system for maintaining the arc length substantially constant while one or more other arc parameters change, for example, arc current and arc voltage in a system wherein programmed changes are intentionally made.

More specifically, an object of the invention is to permit the welding operator to change the arc current, or other arc parameter that affects the arc voltage, according to the requirements of the welding process under various circumstances while the automatic arc voltage control operates to maintain the arc length substantially constant regardless of programmed changes in the arc current level or in such other pertinent arc parameter.

A further object is to maintain the arc length constant during programmed variations in arc current such as are essential in a pulsed power welding system of the general type disclosed and claimed in U.S. Pat. 3,071,680, issued Jan. 1, 1963 to N. E. Anderson and W. J. Greene, assigned to the assignee of the present application. The patent relates to consumable electrode welding but similar types of power supplies can be used with a non-consumable electrode.

Another object is to permit current programming to a uniform percentage of weld penetration through the thickness of a workpiece of variable thickness.

Another object is to prevent the automatic arc voltage control device from excessively shortening the arc and driving the electrode into the work or extinguishing the arc when the current is changed in one direction and excessively lengthening the arc when the current is changed in the opposite direction.

A feature of the invention is the use of a conventional automatic voltage control device with a modified input which includes not only the usual input voltage proportional to arc voltage but also a second input which is a function of another arc parameter, for example the arc current.

A related feature is the use of the difference between the two voltage inputs to operate the voltage control device in order to confine the automatic adjustment of the arc length, to compensate for changes in arc length, and render the arc length adjustment insensitive to arc voltage changes that are due to changes in some other arc parameter.

Other features, objects and advantages will appear from the following more detailed description of an illustrative embodiment of the invention, which will now be given in conjunction with the accompanying drawings.

In the drawings:

FIG. 1 is a typical, somewhat idealized, graph of the voltage-current relationship in an electric arc, for various arc lengths together with the current-voltage graph of the output of a function fitting circuit and graphs useful in explaining the operation of such a circuit;

FIG. 2 is a schematic diagram of an illustrative embodiment of the invention;

FIG. 1 shows typical plots of arc voltage $E$ as a function of arc current $I$ for different arc lengths, the curve 20 being for a relatively long arc and the curve 22 being for a relatively short arc.

Figure 3:
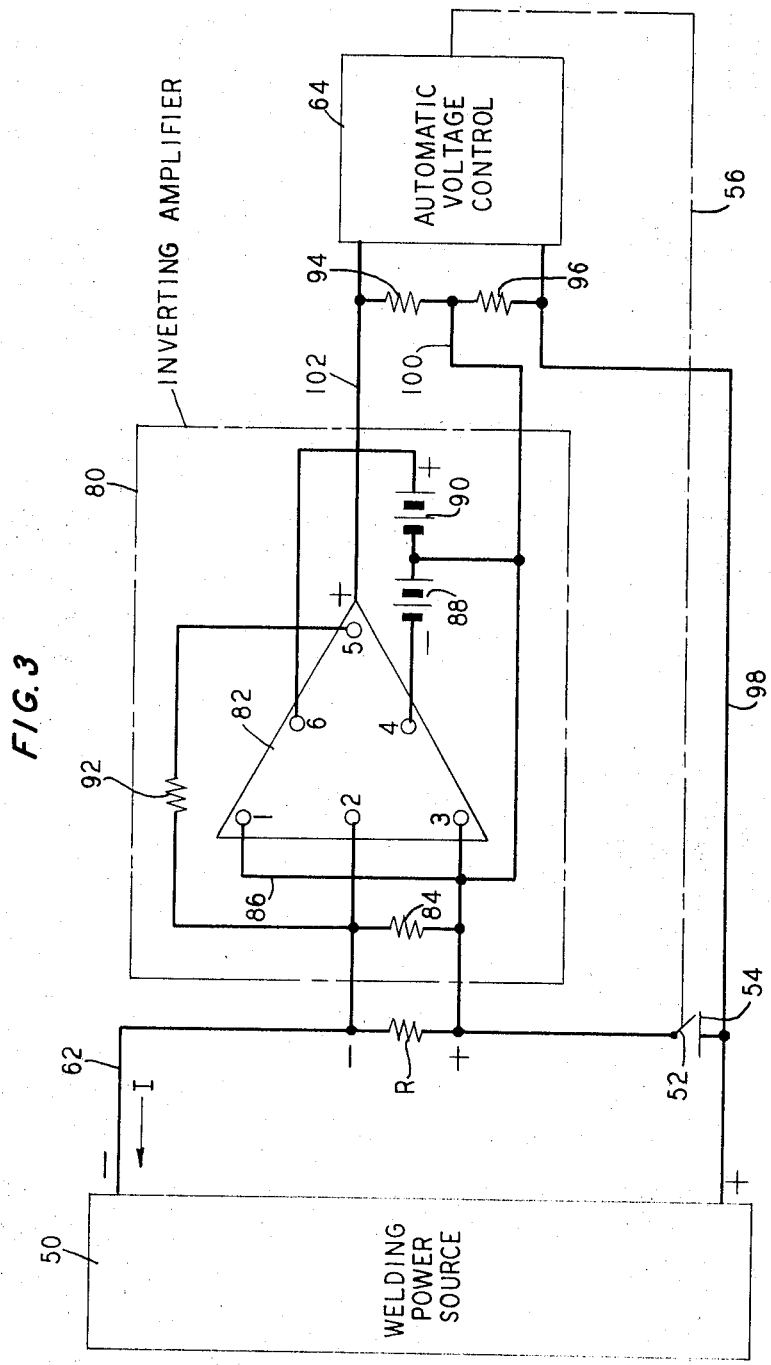
FIG. 3 is a schematic diagram of another illustrative embodiment.

It will be supposed that the arc is initially relatively long and that the arc voltage is $E_1$ and the arc current is $I_1$, as indicated at the operating point 24. If, subsequently it is desired to change the arc current to $I_2$ without changing the arc length, a new operating point will be established at 26 on the curve 20, where the arc voltage is now higher than before, with a value $E_2$, and the arc current is $I_2$ as predicated.

It will now be supposed that the arc length is automatically controlled in conventional manner by means of an automatic voltage control device which senses changes in the arc voltage and responds by changing the spacing of the electrode tip from the surface of the weld pool in such amount as to hold the arc voltage substantially constant. If the arc current is kept constant, the automatic voltage control will maintain a substantially constant arc length, but if the arc current changes, for any reason, the arc length will also change and, in the absence of the present invention, the automatic voltage control device will thereafter maintain the arc length stable at the new arc length. This effect may be seen from an examination of FIG. 1. When, as above described, the arc current has been changed from $I_1$ to $I_2$, moving the operating point along the curve 20 from the point 24 to the point 26, the automatic voltage control will thereupon re-establish the original arc voltage $E_1$ by moving the operating point vertically downward to the point 28 on the curve 22, and in doing so will shorten the arc. Similarly, if the arc current is reduced, the automatic voltage control will, in the absence of the present invention, operate to lengthen the arc to re-establish equilibrium at the original arc voltage $E_1$.

In order to attain an automatic control over the arc length regardless of changes in arc current, I feed into the input of the automatic voltage control device not only a voltage which represents the arc voltage, but also a second voltage which is a function of the arc current, which second voltage serves as a movable reference voltage for the automatic voltage control device. These two control voltages are opposed to each other in polarity so that when the arc voltage changes in response to a change in the arc current, the change in the arc voltage is offset by a corresponding change in the reference voltage that is derived from the arc current. The two control voltages are adjusted in relative amplitudes so that for constant arc length the algebraic sum of these two voltages remains substantially constant. As a result, the arc length is regulated only in response to changes in the difference between the two control voltages.

In a typical case, it was found that a change in arc current from 100 amperes to 300 amperes caused the automatic voltage control device to shorten the arc to such an extent that the arc voltage decreased by 5 volts. In some cases, the shortening of the arc to this extent results in the arc electrode being driven into the work or into the weld pool with deleterious results.

The curve 30 between the curves 20 and 22 represents the voltage-current relationship for an intermediate arc length. With reference to point 24 as the starting point, the point 32 on the curve 30 represents an operating point for the case where the arc length has shortened for some reason while there has been no change in the arc current. In this case, the automatic voltage control device receives a change in control voltage, say 2.5 volts, which is effective to lengthen the arc to approximately the original length, returning the operating point to the point 24. There is no change in control voltage contributed by the arc current.

To illustrate the case in which there is a change both in the arc length and in the arc current, the point 34 is shown on curve 30. Starting from point 24 and going to point 34, the arc current rises from $I_1$ to $I_2$ and the arc voltages rises from $E_1$ to a value $E_3$ intermediate between $E_1$ and $E_2$. Now, the change in arc current produces a control voltage change of say —5 volts which tends to lengthen the arc, and the change in arc voltage produces a control voltage change of say +2.5 volts which tends to shorten the arc. The net result is to move the system to the operating point 26 where the original arc length is approximately restored at the new arc current.

FIG. 2 shows a welding power source 50, represented in block form, the power source being characterized by substantially constant current operation over time intervals of suitable duration and controllable as to current level. The current level control feature is shown for clarity of description as a separate control block 51 although the current level control means may be incorporated within the apparatus included in block 50. The current level control apparatus may be actuated manually by means such as a knob 53 or automatically by a programming means 55. The combination of the power source 50, current level control 51 and programming means 55 may constitute a pulsed power welding device of the general type disclosed and claim in U.S. Pat. 3,071,680 above cited.

The power source 50 provides constant current at any desired current level as determined by the setting of the current level control 51. The operator can select a current level suitable for the particular work at hand.

The system may be operated as a pulsed power welding system wherein the current level is switched between a high level for rapid heat transfer from the electrode 52 to the work 54 and a low level to cool the workpiece while maintaining the arc alive between heat transfer intervals. The frequency of alternation between the two current levels as well as the relative time of dwell at the two current levels may be adjusted to obtain optimum welds without excessive temperature rise in the workpiece or other deleterious effect.

In whatever manner the current level may be changed from time to time, the system herein disclosed maintains the arc length constant within closed limits such as are required for production of uniformly satisfactory weldments.

When a sufficiently complex function fitting circuit 110 is employed, the low current level, or keep-alive current, may be placed in a negative resistance region 114 (FIG. 1) without resulting in any instability of operation of the system.

The power source 50 is usually connected as shown, with its negative terminal leading to a welding electrode 52 and with its positive terminal leading to a workpiece 54, although the reverse connection may be used under certain appropriate circumstances, such as weldnig aluminum.

To obtain a control current $kI$ proportional to the arc current I, there is provided a current measuring arrangement involving a pair of saturable inductors 58 and 60. The conductor 62 which connects the negative terminal of the source 50 to the arc electrode 52 is linked with each of the inductors in serial relationship. The inductors 58 and 60 are employed in known manner to generate a current $kI$ which in combination with R116 generates voltage $kIR$ which is impressed upon the input of function fitting circuit 110. The voltage output signal $E_o$ developed by the function fitting circuit 110 due to the voltage $kIR$ applied thereto is combined with the arc voltage E existing between the electrode 52 and the work 54 to impress an input voltage $E-E_o$ upon an automtaic voltage control device 64, the output of which may be in mechanical form or other suitable form to actuate an arc length adjusting means 56, indicated schematically by a broken line in such manner as to change the arc length, when required, in the proper direction to maintain the input voltage of the device 64 substantially constant.

The combination of the automatic voltage control device 64 and the arc length adjusting mechanism 56 is a well known and commercially available one and for that reason a more detailed description than herein given is not believed necessary. This combination is found to be capable of regulating the arc length in such manner as to maintain the arc voltage constant within ±0.05 volt. In practice, it is found that the arc voltage does not vary more than ±0.1 percent. This device is in common use in applications where the arc current remains substantially constant, in which case the device serves to maintain the arc voltage substantially constant and consequently to maintain the arc length constant.

The present invention makes it possible to realize the high precision of this automatic voltage control apparatus without limitation to a constant current level, so that the voltage control apparatus is enabled to operate substantially independently of arc current changes to maintain the arc length substantially constant.

The function fitting circuit 110 receives an input voltage of magnitude $kIR$ and develops an output voltage of magnitude $E_o$ which, as a function of the current I, is arranged to follow a curve such as the curve 112 in FIG. 1 which follows approximately parallel to one or another of the family of curves 20, 22, 30, or approximately parallel to an average curve representative of that family of curves. A substantially constant voltage difference $$E_c = E - E_o$$

exists between curve 112 and, for example, curve 22.

Figure 4:
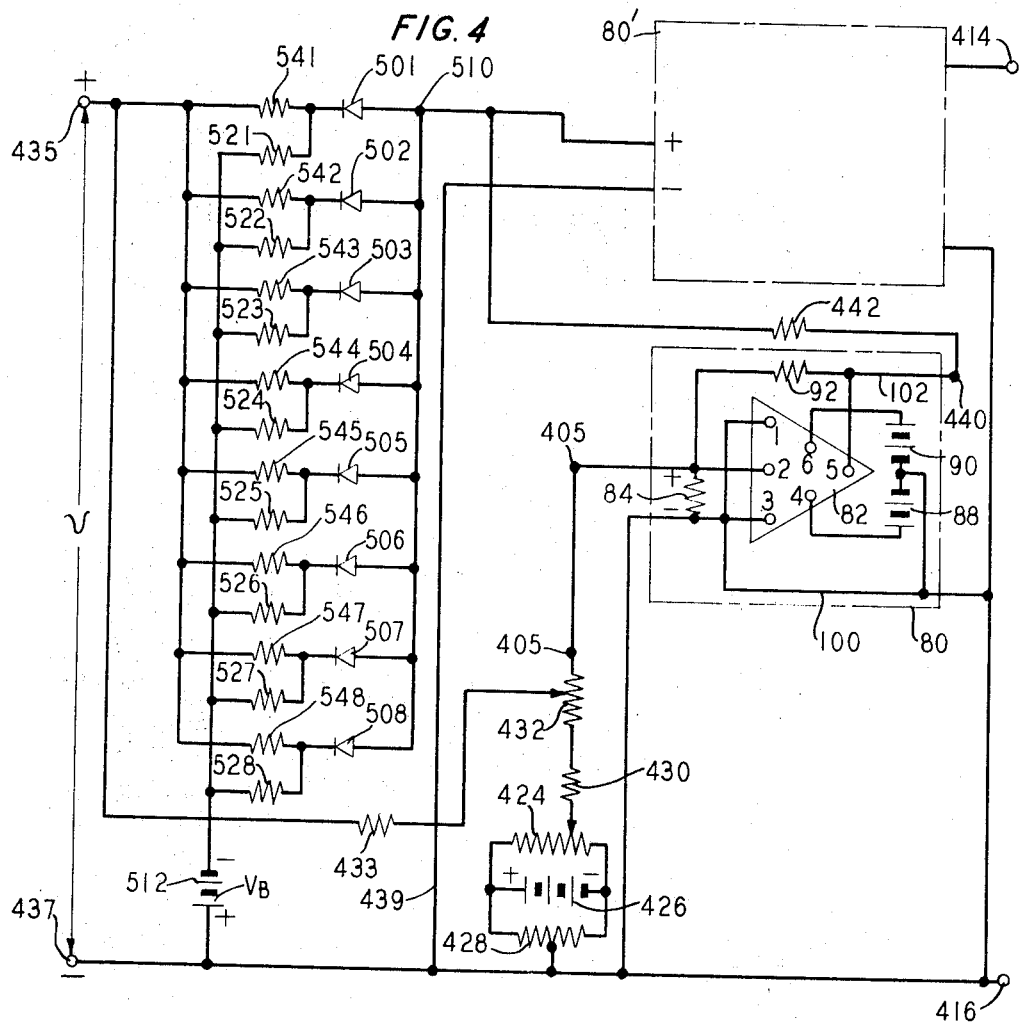
FIG. 4 is a schematic diagram of a suitable function fitting circuit for use in connection with the invention.

The function fitting circuit 110 may be as shown in FIG. 4, designed in accordance with principles laid down in an "Applications Manual for Computing Amplifiers," published by Philbrick Researches, Inc., of Dedham, Mass., and ready-made circuits suitable for use in practicing the invention are available from that company. The design principles governing function fitting circuits of this kind are treated extensively in a monograph No. 137M, entitled "Function Generators Based on Linear Interpolation with Applications to Analogue Computing," by E. G. C. Burt and O. H. Lange, published in June 1955 by the Institution of Electrical Engineers in England. Accordingly, the following general description of the circuits of FIG. 4 is considered sufficient for the disclosure of the present invention.

The straight line portion 113 of the curve 112, is generated by the combination of a fixed biasing voltage and a resistor carrying a current proportional to the current $kI$. The fixed biasing voltage is determined by the y-axis intercept of the line 113 and is represented by a horizontal line 116 in FIG. 1. The resistance value of the resistor determines the slope of the line 113, which in the example shown in FIG. 1 is upward from left to right and of a given magnitude.

The biasing voltage is obtained as shown in FIG. 4 from a biasing battery 426 and is adjusted in magnitude by means of a potentiometer 424 with a movable contact arm. The intercept may in general be either positive or negative. In the example shown in FIG. 1, the intercept is negative and is obtained by setting the potentiometer arm toward the right hand negative end of the potentiometer 424, whereupon the selected biasing potential is impressed upon the input terminal 2 of an inverting amplifier 80 through a resistor 430 and a potentiometer 432.

The inverting amplifier 80 may be of any suitable type. In an embodiment of the invention that has been successfully operated, I have used as an inverting amplifier in this position a device 82 which is on the market under the designation of a monolithic operational amplifier, MC1530, obtainable from Motorola Semiconductor Products, Inc., of Phoenix, Ariz. This operational amplifier has ten terminals, numbered 1 through 10, of which for the present purpose I use only 1–6. To make the device 82 function as an inverting amplifier, the terminals 1 and 3 are strapped together. The terminals 2 and 3 serve as the input terminals and are shunted by a suitable resistor 84. Power is supplied to the device 82 from two direct current sources 88, 90, illustrated as batteries, connected in series aiding relation, and preferably 6 volts each. The negative terminal of source 88 is connected to terminal 4, the positive terminal of source 90 is connected to terminal 6, and the common terminal of the sources 88 and 90 is connected to a lead 100 which connects also with terminal 3. The output voltage is developed between terminals 3 and 5, and the terminal 5 is connected to a lead 102. A feedback resistor 92 is advantageously connected between terminals 2 and 5 to improve linearity of response in the inverting amplifier.

The line 112 together with its downward extension 115 is generated by impressing the voltage $kIR$ upon an adjustable portion of the potentiometer 432 by way of a resistor 433. A voltage drop in the lower portion of the potentiometer develops a voltage that opposes the biasing voltage increasingly as the votlage $kIR$ increases, the difference being the effective voltage impressed between the terminals 2 and 3 of the amplifier 80. The slope of the line is adjusted by means of the potentiometer 432 and the intercept is adjusted by means of the potentiometer 424.

By using negative feedback with sufficiently high amplification in the amplifier 80 the input voltage at a point 405 at the input can be held substantially at zero voltage, with the result that the output voltage of the amplifier 80, impressed upon an output terminal 440, is always substantially the negative of the voltage impressed upon the point 405 by the potentiometer 432. It is because of this property that amplifier 80 serves as a reversing or inverting device, which in this instance converts a positive voltage at point 405 into a negative voltage at the terminal 440.

The shape of the curved portion 114 of the curve 22 is aproximated by a curve 120 comprised of a plurality of straight line segments with varying slopes and y-axis intercepts. The curve 120 is generated by a plurality of diode-potentiometer units as shown in FIG. 4. A representative such unit comprises a diode 501 connected to the junction of a pair of resistors 521 and 541. The resistors form the required potentiometer. The conductive direction of the diode is toward the junction of the resistors.

The action of the typical diode-potentiometer unit is as follows. The voltage $kIR$ is impressed upon a pair of input terminals 435, 437, in such polarity as to back bias the diode 501. A fixed forward bias is impressed upon the diode 501 from a battery 512 which when the voltage $kIR$ is less than the forward bias tends to send current over a lead 439 to the input circuit of an inverting amplifier 801 and thence through the diode 501, and the resistor 541. The amplifiers 80 and 80' can be similar or identical to each other.

Figure 6:
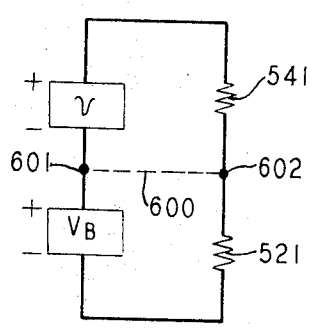
FIG. 6 is a diagram useful in explaining the adjustment of a component in the circuit of FIG. 4 to fit a given function.
Figure 5:
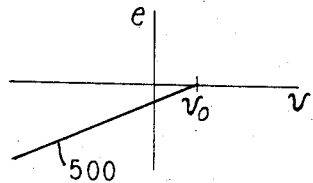
FIG. 5 is a graph of the response of a typical component of the circuit of FIG. 4.

The output voltage $e$ derived from the diode-potentiometer unit 501, 521, 541, is shown by a line 500 in FIG. 5, as a function of the impressed voltage $v$. A cutoff voltage $v_o$ exists when the impressed voltage is equal to a selected portion of the voltage of the battery 512. Negative values of $v$, and positive values less than $v_o$ give current flow through the diode 501, which current flows away from a reference point 510 and is for that reason designated as negative. The resistors 541 and 521 which form the potentiometer for the diode are connected across the combined voltage $v$ and the biasing voltage $V_B$ as shown in FIG. 6, from which it is evident that the cutoff voltage $v_0$ is determined by the ratio of the resistance value of the resistor 541 to the resistance value of the resistor 521, together with the value of the biasing voltage $V_B$.

The slope of the line 500 in FIG. 5 is determined mainly by the resistance value of the resistor 541. This is because when the diode 501 is conducting there is a virtual short circuit between the junction 601 of the sources of the voltages $v$ and $V_B$ and the junction 602 of the resistors 521 and 541 as indicated by a broken line 600 in FIG. 6, isolating the voltage $v$ from the voltage $V_B$ and generating current through the resistor 541 in direct proportion to the voltage $v$.

Thus each of the diode-potentiometer units can be separately adjusted to an individual value of cut-off voltage and an individual value of slope of the line 500.

The curve 120 is shown as made up of the line segments 131 from a current value $I_3$ to a current value $I_4$, 132 from $I_4$ to $I_5$, 133 from $I_5$ to $I_6$, etc., through 138 from $I_{10}$ to $I_{11}$. The line 131 is extended to cross a vertical line at current value $I_5$, line 132 to cross a vertical line at current value $I_6$, etc. Lines $D_{501}$, $D_{502}$, through $D_{508}$, are lines like line 500 (FIG. 5), each with the proper cut-off point and slope to combine to give a good approximation to the curve 120 and the curve 22.

Line $D_{501}$ has its cut-off at current $I_3$, and its slope is such that the value of $D_{501}$ at current $I_4$ is equal to the difference $d_{501}$ between the line 113 and the line 131 at current $I_4$. Similarly, line $D_{502}$ has its cut-off at current $I_4$ and its slope is such that the value of $D_{502}$ at current $I_5$ is equal to the difference $d_{502}$ between the line 132 and the line 131 at current $I_5$. The cut-offs and slopes for the diodes 503 through 508 are similarly determined.

The currents from all the diodes 501 through 508 are summed up at the point 510 and the sum is impressed upon the inverting amplifier 80'.

To simulate the entire curve 112, 120, it is required to combine in proper relation of polarities the voltages at the points 405 and 510 to obtain a resultant voltage between a pair of output terminals 414, 416. For this purpose, the voltage at the point 440 in the output of the amplifier 80 is transmitted to the point 510 by way of a resistor 442. Thus the voltage at point 510 undergoes a single reversal when transmitted to the output terminal 414, while the voltage at point 405 undergoes a double reversal en route to terminal 414. The result is that the arc current-voltage curve 22, for example, is oposed to the current-voltage curve 113, 120 at the input of the automatic voltage control device 64. Since there is a substantially constant difference $E_c$ between the two current-voltage curves, the automatic voltage control device is not sensitive to arc current changes and responds only to changes in $E_c$. Otherwise stated, the curve 113, 120 shows a voltage which varies with current at a rate expressable in volts per ampere. This rate is substantially the same at every value of arc current as the rate of change in volts per ampere in the voltage signal representative of the arc voltage as a function of the arc current.

FIG. 2 shows how the function fitting circuit of FIG. 4 is inserted to serve as the block 110 of FIG. 2.

If it is feasible to limit operation of the electric arc to the straight line positively sloping portion of the curves 20, 22, 30, the function fitting circuit 110 may be omitted, in which case the voltage across the resistor 116 provides the voltage $E_o$ of magnitude $kIR$.

When the current I changes, the voltage E likewise changes. If there is to be equality of the control voltage $E-kIR$ before and after a current change, it must be true that $$E_2-kI_2R=E_1-kI_1R$$

from which a suitable value of R is seen to be $$R=(E_2-E_1)/k(I_2-I_1)$$

In the numerical example given above, a voltage difference of 5 volts coresponds to a current difference of 200 amperes, so that $$R=5/200k$$

The current ratio $k$ in a system using saturable inductors, as shown in FIG. 2, is substantially equal to the turns ratio of the windings, for example, 1 to 3000, where the winding carrying the arc current is the single turn 62 and the winding 66 has 3000 turns.

Using this value of 1/3000 for $k$, the resistance of the resistor R comes out 75 ohms. In practice, however, the best value for R will depend to some extent upon the response characteristics of the automatic voltage control element 64 and the arc length adjusting mechanism 56. The best value of R can be found by varying the value of R in the actual system to obtain the highest obtainable degree of compensation for arc currents over the desired operating range of arc currents.

The current measuring arrangement is of the kind disclosed in U.S. Pat. 3,123,761, issued Mar. 3, 1964 to W. J. Greene, in FIG. 8 of that patent, and will now be described in greater detail. The inductors 58 and 60 are provided with multi-turn windings 66 and 68, respectively, which are so poled as to form a series-aiding circuit in series connection with a full-wave rectifier bridge 70 and the secondary winding 72 of a transformer 74. The primary winding 76 of the transformer 74 is connected to an alternating current source 78. The direct current output from the bridge 70 is connected across the resistor R.

As the invention is not dependent upon the particular current measuring means employed to measure the arc current, a brief description of the mode of operation of the measuring means disclosed herein is believed to suffice. The current I in the conductor 62 is made sufficiently large to initially saturate the inductors 58 and 60 for all values of welding current that are to be used, even the smallest. The source 78 is made to have sufficiently constant voltage so that the magnitude of the alternating current which it sends through the windings 66 and 68 and rectifier 70 is regulated substantially only by the action of the inductors 58 and 60 as explained below. This current is rectified by the rectifier 70 to provide a direct current $kI$ in the resistor R.

The windings 66 and 68 are wound in such relative directions on the respective cores of the inductors 58 and 60 that at any given instant the alternating current delivered to the windings by the source 78 is in the direction to desaturate the core of one of the inductors and to intensify the saturation in the core of the other inductor.

The voltage wave impressed upon the windings 66 and 68 by the source 78 is required to be restricted to the integrated value of volt-seconds that is insufficient to reversely saturate either of the inductors. Whichever inductor is at the moment in the process of being desaturated regulates the current impressed upon the rectifier 70, while the other inductor, being saturated, appears only as a small or negligible resistance in the circuit. When one inductor, say inductor 58, is being desaturated, the current through the corresponding winding 66 rises until the flux in the inductor is substantially annulled. The current required to annul the flux is substantially proportional to the current in the conductor 62 and so measures that current. The remaining integrated volt-seconds of the voltage wave are expended in trying to reverse the flux in the inductor, with little or no measurable change in the current produced. There are, however, insufficient integrated volt-seconds to complete the reversal, and as the voltage finally subsides, the current in the conductor 62 again prevails and re-saturates the inductor in the original polarity. The net result is that a square topped pulse is applied to the rectifier 70, the amplitude of the pulse being substantially proportional to the arc current. The inductors generate pulses alternately and thus a wave train is impressed upon the rectifier 70, the amplitude of which is at all times substantially proportional to the arc current I. The rectified current from the rectifier 70 flows though the resistor R and has the magnitude $kI$. In each half cycle of the current from the source 78, as the voltage diminishes toward zero, there is an interval during which the inductive effect of the active winding, 66 or 68, forces the current to keep flowing through the resistor R to overlap the next half-cycle. The result is a smoothed-out current passing continually through the resistor R.

FIG. 3 shows another way of obtaining the required voltage representative of the arc current. In this case, the resistor R is connected in series with the arc in the line 62. Across the resistor R there are connected the input terminals of an inverting amplifier 80 of the type described above. The output voltage $-kIR$ from the inverting amplifier is obtained between leads 100 and 102 and is impressed upon a load resistor 94. The arc voltage E is impressed over leads 100 and 98 upon a load resistor 96, the resistors 94 and 96 being serially connected to each other in shunt relation to the input terminals of the automatic voltage control device 64. In this way, the control voltage $E_c=E-kIR$ is impressed upon the input of the device 64 with the same result as has been described with reference to FIG. 2.

While a device for automatically adjusting the arc length in an electric welding system is generally of the automatic arc voltage control type, an automatic current control device may be used instead. In the latter case, as before, it may be desirable to change from one operating current value to another according to the needs of the work. It will be necessary to prevent the automatic current control from defeating the desired current change. For this purpose, two inputs may be impressed upon the automatic current control device, one proportional to the arc current and another, acting in opposition to the first, proportional to the arc voltage. Then, when it is desired to operate at a changed current value, the operator may change the arc voltage to a value corresponding to the desired new value of arc current. The automatic current control device will then maintain the arc length substantially constant while permitting the desired change in arc current. It will be understood that this use of automatic current control is analogous to the use of automatic voltage control described above. The use of automatic current control is appropropriate where the arc length varies more rapidly with changing arc current than with changing arc voltage, as for example in the lefthand portion of FIG. 1 where the curves slope steeply upward to the left. Automatic voltage control is appropriate where the curves are more nearly horizontal, as in the righthand portion of FIG. 1.

The invention is not limited to direct current welding but may also be applied to alternating current welding, for example to the system disclosed and claimed in Pat. 2,671,843, issued Mar. 9, 1954 to R. B. Steele, and owned by the assignee herein. To apply the present invention to alternating current welding, the alternating arc current can be rectified to provide a signal voltage that is proportional to the arc current, and this signal can be combined in opposing polarity with a rectified signal that is proportional to the straight polarity arc voltage, to obtain a control voltage that is used to actuate a device for adjusting the arc length.

The principles of the invention can be extended to compensate for changes in two or more arc parameters other than arc length, by providing an additional control voltage component for each additional arc parameter to be compensated.

While illustrative forms of apparatus and methods in accordance with the invention have been described and shown herein, it will be understood that numerous changes may be made without departing from the general principles and scope of the invention.

I claim:

1. An electric arc welding system for use with a non-consumable electrode, comprising in combination, programmable power supply means to supply a variable current to the arc, means to adjust the arc length, means to develop a voltage sensitive signal proportional to the magnitude of the arc voltage, means to develop a current sensitive signal proportoinal to the magnitude of the arc current, means connected to the adjusting means and responsive to the difference between said voltage sensitive signal and said current sensitive signal to provide a control signal for actuating said arc length adjusting means, whereby the arc length is maintained substantially constant.

2. An electric arc welding system for use with a non-consumable arc electrode, comprising in combination, programmable power supply means to vary the current level supplied to the arc from a power supply device according to a desired program, motive means to adjust the spacing between the arc electrode and the workpiece, arc voltage sensing means to develop a voltage sensitive signal proportional to the magnitude of the arc voltage, arc current sensing means to develop a current sensitive signal which varies with arc current at a rate expressable in volts per ampere substantially the same as the rate of change in volts per ampere of said voltage sensitive signal, control means conected to the motive means and responsive to the difference between said voltage sensitive signal and said current sensitive signal to cause said motive means to tend to maintain the arc length constant.

3. An electric arc welding system for use with a non-consumable arc electrode, comprising in combination, programmable power supply means to vary the current level supplied to the arc from a power supply device according to a desired program, motive means to adjust the spacing between the arc electrode and the workpiece, arc voltage sensing means to develop a voltage sensitive signal proportional to the magnitude of the arc voltage, arc current sensing means to develop a current sensitive signal proportional to arc current, function fitting means generating a current voltage reference function which varies with current at a rate expressable in volts per ampere substantially the same as the rate of change in volts per ampere of said voltage sensitive signal, control means connected to the motive means and responsive to the difference between said voltage sensitive signal and the voltage developed by said function fitting means to cause said motive means to tend to maintain the arc length constant.

4. An electric arc welding system for use with a non-consumable arc electrode, comprising in combination, means to supply current to the arc alternately at a high current level to effect rapid heat transfer to the workpiece and at low current level to keep the arc alive between rapid heating periods, means to adjust the arc length, arc voltage sensing means to develop a voltage sensitive signal proportional to the magnitude of the arc voltage, arc current sensitive means to develop a current sensitive signal which varies with arc current, function fitting means to develop a reference voltage signal that simulates the current-voltage characteristic of the arc, control means connected to the adjusting means and responsive to the difference between said voltage sensitive signal and said reference voltage signal to provide a control signal to actuate said arc length adjusting means, whereby the arc length is maintained substantially constant during current pulses supplied to the arc.

5. The method of maintaining a constant arc length in a non-consumable electrode electric arc welding process wherein the arc current is pulsed between a high level at which rapid heat transfer to the workpiece occurs and a low level for maintaining the arc alive between rapid heating periods and the arc voltage varies with the arc current at a given rate of volts per ampere, said method comprising the steps of sensing arc voltage and developing a signal proportional to the magnitude thereof, concurrently sensing arc current and developing a signal proportional to the magnitude thereof, which signal varies with the arc current at substantially the same rate of volts per ampere as the arc voltage varies with the arc current, combining said sensed signals to produce a control signal of one sense in response to increases in arc voltage and decreases in arc current, and of the opposite sense in response to decreases in arc voltage and increases in arc current, and controlling the position of said electrode in relation to said workpiece in response to the control signal, whereby the arc length may be maintained constant.

6. An electric arc welding system for use with a non-consummable arc electrode in an atmosphere of inert gas, comprising in combination, means to supply pulses of current to the arc alternately at high current level to effect rapid heat transfer to the workpiece and at low current level to keep the arc alive between rapid heating periods, means to adjust the arc length, means to develop a voltage sensitive signal proportional to the magnitude of the arc voltage, means to develop a current sensitive signal proportional to the magnitude of the arc current, means responsive to said current sensitive signal to develop a reference voltage signal which is a function of the arc current, means connected to the adjusting means and responsive to the difference between said voltage control sensitive signal and said reference voltage signal to provide a control voltage for actuating said arc length adjusting means, whereby the arc length is maintained substantially constant.

7. Apparatus in accordance with claim 6 in which said reference voltage signal developing means consists in a resistor.

8. Apparatus in accordance with claim 6 in which said reference voltage signal developing means comprises a function fitting circuit.

9. Apparatus in accordance with claim 6 in which the said reference voltage signal as a function of arc current fits the current-voltage function of the arc over a material range of arc current values.

10. Apparatus in accordance with claim 9 in which the said reference voltage signal as a function of arc current fits the current-voltage function of the arc over a substantially straight line portion over which the arc voltage increases as the arc current increases.

11. Apparatus in accorrdance with claim 9 in which the said reference voltage signal as a function of arc current fits the current-voltage function of the arc over a portion thereof in which the arc voltage decreases as the arc current increases.

12. Apparatus in accordance with claim 9 in which the said reference voltage signal as a function of arc current fits the current-voltage function of the arc over a range including material portions wherein the arc voltage increases as the arc current increases and material portions wherein the arc voltage decreases as the arc curent increases.

References Cited

UNITED STATES PATENTS

| | | | |
|---|---|---|---|
| 2,640,947 | 6/1953 | Journeaux | 314—69 X |
| 2,832,000 | 4/1958 | Steele | 219—131 X |
| 2,901,588 | 8/1959 | McKechnie | 219—69 |
| 3,339,107 | 8/1967 | Aldenhoff | 219—131 X |

JOSEPH V. TRUHE, Primary Examiner

J. GREGORY SMITH, Assistant Examiner

U.S. Cl. X.R.

219—131

UNITED STATES PATENT OFFICE
CERTIFICATE OF CORRECTION

Patent No. 3,538,299        Dated November 3, 1970

Inventor(s) Evans H. Daggett

It is certified that error appears in the above-identified patent and that said Letters Patent are hereby corrected as shown below:

Column 3, line 35, "voltage$\underline{s}$" is corrected to read -voltage

Column 6, line 73, "oposed" is corrected to read -op$\underline{p}$ose

Column 7, line 23, "R=$(E_2-E_1)/k(I_2-\underline{I_2}-I_1)$" is corrected to read - R=$(E_2-E_1)/k(I_2-I_1)$ Column 7, line 26, "coresponds" is corrected to read -cor$\underline{r}$es Column 10, line 48 after "current," insert -control- Column 10, line 49, delete the word "control Column 10, line 69, "accor$\underline{r}$dance" is corrected to read -accor Column 11, line 4, the word "curent" is corrected to read -cu

SIGNED AND
SEALED
MAR 2 1971

(SEAL)
Attest:

Edward M. Fletcher, Jr.
Attesting Officer

WILLIAM E. SCHUYLER,
Commissioner of Pate